US009203260B2

(12) United States Patent
Knubben et al.

(10) Patent No.: US 9,203,260 B2
(45) Date of Patent: Dec. 1, 2015

(54) SECURE WIRELESS CHARGING

(71) Applicant: NXP B.V., Eindhoven (NL)

(72) Inventors: Wihelmus H. C. Knubben, Susteren (NL); Klaas Brink, Waalre (NL); Aliaksei Vladimirovich Sedzin, Eindhoven (NL); Johannes Petrus Maria van Lammeren, Beuningen (NL)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 14/541,053

(22) Filed: Nov. 13, 2014

(65) Prior Publication Data

US 2015/0071444 A1 Mar. 12, 2015

Related U.S. Application Data

(63) Continuation of application No. 13/735,316, filed on Jan. 7, 2013, now abandoned.

(51) Int. Cl.
*G06F 21/44* (2013.01)
*H02J 7/02* (2006.01)
*H04L 9/32* (2006.01)
*H04B 5/00* (2006.01)
*H04W 12/06* (2009.01)
*G06F 21/35* (2013.01)
*H02J 7/00* (2006.01)
*H04W 12/02* (2009.01)

(52) U.S. Cl.
CPC .............. *H02J 7/025* (2013.01); *H04B 5/0037* (2013.01); *H04L 9/32* (2013.01); *H04W 12/06* (2013.01); *H02J 2007/0001* (2013.01); *H04L 2209/80* (2013.01); *H04W 12/02* (2013.01)

(58) Field of Classification Search
CPC ....... H04W 12/06; H04W 88/02; H04W 8/20; H04W 4/008; H04B 5/0037; H04B 5/0062; H04B 5/0012; H04L 12/14; G06F 21/44
See application file for complete search history.

(56) References Cited

U.S. PATENT DOCUMENTS

| 6,429,622 | B1 | 8/2002 | Svensson |
| 7,834,742 | B2 | 11/2010 | Amtmann |
| 8,212,518 | B2 | 7/2012 | Pijnenburg et al. |
| 8,238,823 | B2 | 8/2012 | Maugars et al. |

(Continued)

FOREIGN PATENT DOCUMENTS

| WO | 2007004582 A1 | 1/2007 |
| WO | 2011044543 A2 | 4/2011 |

OTHER PUBLICATIONS

Building a Prototype Prepaid Electricity Metering System Based on RFID. Al-Naima. IJECEE(2012).*

(Continued)

*Primary Examiner* — Venkat Perungavoor

(57) ABSTRACT

A wireless charging apparatus and method utilizing a secure element is disclosed. Illustratively, a receiver containing a secure element securely communicates with a charging pad also equipped with a secure element. The communication can be used to establish the identity of the receiver and facilitate billing for the wireless charging. The charging pad may further communicate in a secure manner with a server to authenticate the identity and other information about the receiver before providing wireless charging. Direct communication between the receiver and server is also contemplated.

14 Claims, 2 Drawing Sheets

(56) References Cited

U.S. PATENT DOCUMENTS

| | | | |
|---|---|---|---|
| 8,723,642 B2 | 5/2014 | Park et al. | |
| 2005/0182674 A1 | 8/2005 | Yeo | |
| 2009/0206165 A1 | 8/2009 | Laackmann et al. | |
| 2010/0073143 A1 | 3/2010 | Schaffler | |
| 2010/0201313 A1* | 8/2010 | Vorenkamp et al. | 320/108 |
| 2011/0136550 A1 | 6/2011 | Maugars | |
| 2011/0184888 A1* | 7/2011 | Lee et al. | 705/412 |
| 2011/0193417 A1 | 8/2011 | Hirasaka et al. | |
| 2011/0221391 A1 | 9/2011 | Won et al. | |
| 2012/0173418 A1* | 7/2012 | Beardsmore et al. | 705/40 |
| 2012/0220229 A1 | 8/2012 | Cheon et al. | |
| 2012/0268238 A1* | 10/2012 | Park et al. | 340/5.8 |
| 2012/0290470 A1* | 11/2012 | Lee et al. | 705/39 |

OTHER PUBLICATIONS

SmartGrid Charger for Electric Vehicles Using Existing CellularNetworks and SMS Text Messages. Hochgraf. IEEE(2010).*
A Platform for Charging, Accounting, and Billing in Telecommunications Networks and the Internet. Chakraborty. ICAC3(2009).*
Qualcomm to Demo Wireless Charging Tech for Electric Cars. Poeter. PCMAG(2012).*
Rajagopal et al.; "Multiple receiver support for magnetic resonance based wireless charging"; IEEE; 2011.
Waffenschmidt, Eberhard; "Wireless Power for Mobile Devices"; IEEE 2011.
Zhang et al.; "A New Architecture of trading platform based on cloud computing"; IEEE 2010.
Choi et al.; "A Secure Application Invocation Mechanism in Mobile Phones for Near Field Communication"; IEEE, 2012.
"Qi System Description Wireless Power Transfer—vol. 1: Low Power, Part 1: Interface Definition, Version 1.1.1"; 130 pages (Jul. 2012).
Strommer, Esko, et al; "NFC-Enabled Wireless Charging"; 2012 4th Intl Workshop on Near Field Communication; IEEE Computer Society; 6 pages (2012).
"GBI Research Report—Wireless Charging Market to 2016—Stnadardization to Increase Uptake and Drive Growth"; 49 pages (Feb. 2012).
Yoo, Jinho et al.; "Wireless Charging Technology"; Issue Analysis, 8 pgs.; http://equity.co.kr/upfile/issue/2012/05/10/1336611859340. pdf; May 9, 2012.
Kingsley-Hughes, Adrian; "Can Nokia take wireless charging mainstream", ZDNet Mobility, Sep. 6, 2012.
http://www.computerworld.com/s/article/9233026/17_Starbucks_stores_get_wireless_charging_in_Boston.
Extended European Search Report, 13199583.9, Nov. 3, 2014.

* cited by examiner

_US 9,203,260 B2_

SECURE WIRELESS CHARGING

CROSS-REFERENCE TO RELATED APPLICATIONS

The current application is a Continuation of application Ser. No. 13/735,316, filed Jan. 7, 2013, which is incorporated by reference herein.

FIELD OF THE INVENTION

In general, this invention relates to methods and apparatus for wireless charging. More particularly, it relates to methods and apparatus for wireless charging that include secure communication between receiver and charging pad and/or a server or back office.

BACKGROUND OF THE INVENTION

Many equipments or devices, including, for example, mobile phones and electronic equipments, to name but a few, contain rechargeable batteries. An increasingly popular method of recharging such rechargeable batteries is wireless charging. One example of wireless charging is provided by U.S. Pat. No. 8,212,518. It is common to refer to the charging apparatus as the "transmitter" or "charging pad" or "pad" and to the device or equipment being charged as the "receiver"

SUMMARY OF THE INVENTION

An illustrative embodiment of the present invention includes a receiver adapted to receive wireless charging from a pad having a coil for receiving the wireless charging energy and a secure element for providing encrypted information to the pad. Further embodiments include a communication chip for transmitting the encrypted information.

Other embodiments include a charging pad adapted to receive encrypted information from a receiver and having a coil for charging the receiver and a secure element for decrypting the encrypted information. Further embodiments include a communications chip for transmitting information to the receiver.

Other embodiment include a method of charging a receiver which includes the steps of providing a receiver to a charging pad which has a secure element which provides encrypted information to the charging pad. Such method may also include having the charging pad provide all or part of the encrypted information to a server. The server may be a cloud server. In another embodiment, the server may authenticate the encrypted information and then provide confirmation of the authentication to the charging pad. In a further embodiment, the charging pad may subsequently provide charging to the receiver.

Further embodiments include a method of operating a cloud server to receive and decrypt information provided by a charging pad, which information is provided to a charging pad in encrypted form by a receiver. Further embodiments may include causing the cloud server to reply to the charging pad in an encrypted manner with the reply causing the charging pad to initiate charging of the receiver.

Yet another embodiment includes a method of charging a receiver which includes providing a charging pad which, upon proximate present of a receiver, engages in secure communication with the receiver. The charging pad subsequently transmits the secure communication to a server which performs an authentication procedure and then transmits the results of said authentication procedure to the charging pad, causing the charging pad to provide charging to the receiver. In a further embodiment, if there is no communication between the charging pad and the receiver, the receiver may communicate securely with the server using secure elements. The server may provide a charging signal to the receiver and the receiver may relay this signal to the charging pad which then commences charging. Yet further embodiments contemplated include having the receiver store information regarding payment internally. When the receiver is provided to the pad, the receiver transmits information to the charging pad concerning payment and the charging pad commences charging.

Before or after charging is performed, some form of payment or deduction of points or miles may be received from the receiver or owner of the receiver or another entity.

DETAILED DESCRIPTION OF EXEMPLARY EMBODIMENTS

As wireless charging becomes more popular, there may arise a need to provide facilities for wireless charging of receivers in public places. For example, airports and coffee shops may wish to provide wireless charging for their customers. Shopping malls and other places of business may wish to provide wireless charging for electric automobiles.

Under various circumstances it may be desirable for the provider to charge money for the charging service(s) or for the provider to maintain a record of the charging transaction (i.e. to whom the service was provided, the amount of power transferred, etc.). Wireless charging may be offered to customers as part of a customer loyalty program or may require some sort of immediate payment.

Thus, it is desired that receivers be equipped for charging via pads that communicate with such receivers in a secure manner. It is also desired that such pads be equipped with secure communication and verification capabilities.

Communication between the receiver and the pad may be accomplished via a variety of methods, such as: NFC, Bluetooth, or data modulation on the power carrier (e.g. ASK, FSK, PSK, etc.). For example, the pad may be equipped with an NFC tag which receives a signal from the receiver indicating that the receiver is nearby and in need of charging and indicating further the type of receiver, etc. Alternatively, two-way peer to peer NFC communication may be used. Alternatively, the pad may transmit a low power signal to the receiver; the receiver may harvest some of the incoming power to respond by providing a modulated signal on the same carrier frequency indicating that it needs charging, thereby directing the pad to provide charging energy to the receiver.

Whatever communication method is selected, it may be utilized to provide secure encrypted communication between receiver and pad so that identification of the registered owner of the receiver, identification of various characteristics of the receiver (such as the standard or procedures by which the receiver must be charged), and data related to payment (such as account numbers, crediting or debiting of accounts, or addition or subtraction of loyalty points or miles) may be transmitted between receiver and pad.

The pad may be connected to a server, illustratively a cloud server which may serve to validate payment transactions, or to update public key infrastructure administration or to update loyalty databases (possibly maintained at the pad).

Figure 1:
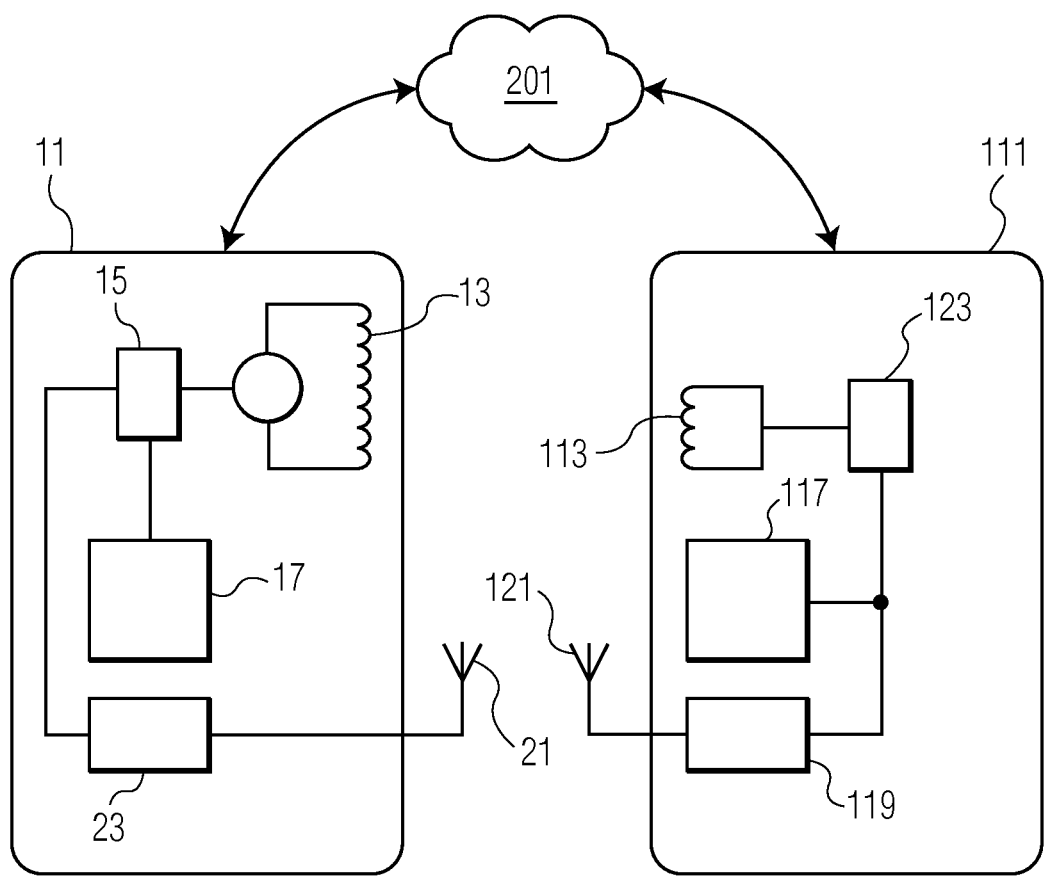
FIG. 1 is a block diagram showing an illustrative embodiment of the present invention.

FIG. 1 shows an illustrative embodiment in more detail. Reference numeral 11 denotes a charging pad. Pad 11 contains a charging coil 13 operating under direction of a controller 15. Pad 11 also contains secure element 17 which operates under the direction of controller 15. Secure element 17 is capable of securely transmitting data, illustratively utilizing RSA or elliptic curves, possibly followed by symmetric key cryptography, and providing verification/non-verification information to controller 15.

If communication with a receiver is to be accomplished via NFC or Bluetooth, a communications module or chip 23 connected to an antenna 21 is provided. Module or chip 23 may operate under direction of controller 15. If communication with the receiver is to be accomplished via modulation of the power carrier, module or chip 23 is not required.

Receiver 111 is equipped with coil 113 for receiving energy for the wireless charging of its battery (not shown). Receiver also contains a secure element 117 for providing encrypted information to pad 11 about the owner of the receiver, perhaps the party to be billed for the charging services, account information (balances, etc.), perhaps information regarding the standard according to which the receiver is to be charged, loyalty point or miles information, etc. Functioning of coil 113 and secure element 117 and communication module or chip 119 (discussed below) is controlled by controller 123 which may include a single chip or multiple chips.

If communication with the pad is to be accomplished via NFC or Bluetooth, a communication module or chip 119 is provided together with an antenna 121.

Prior to the beginning of wireless charging, and prior to transmission of data between the pad and the receiver, an authentication procedure over the communication channel is desirably performed. If authentication is successful, then secure communication via the respective secure elements may be set up. Encrypted tokens may be received, decrypted, and stored by either or both secure elements. Payment details can be established and then wireless charging can commence.

Figure 2:
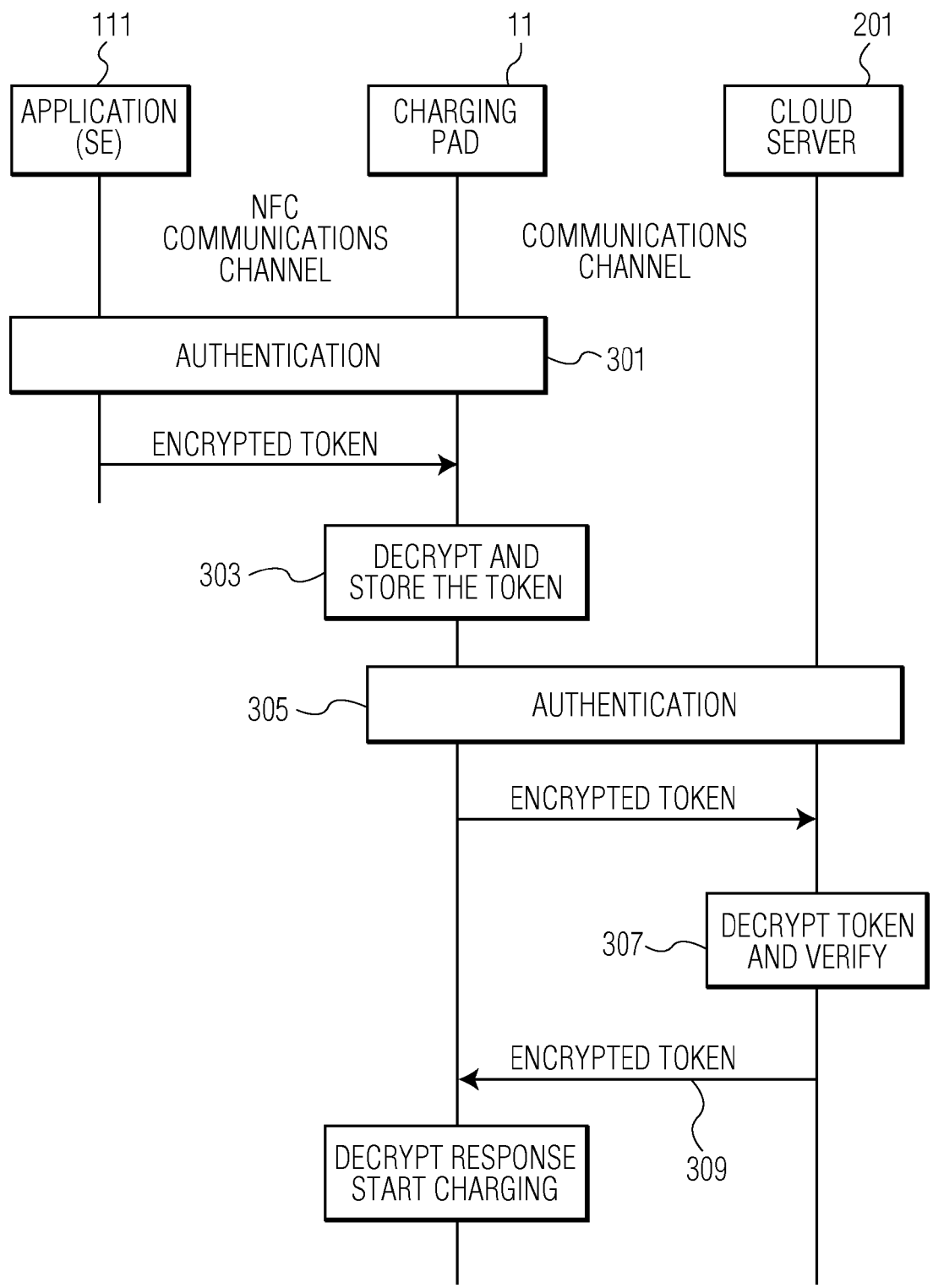
FIG. 2 is a chart showing another illustrative embodiment of the present invention.

FIG. 2 is a chart illustrative of a process that may be followed. Receiver 111 sends a message via a communication channel (which may be one of the channels described above, i.e. NFC, Bluetooth, or various forms of modulation transmitted utilizing energy harvested from an initial pulse provided by pad 11). Sending of this message via encrypted token is for the purpose of authentication and is denoted by reference numeral 301.

Pad 11 receives the encrypted token and decrypts it and may store the token as indicated in step 303. A further authentication takes place in step 305 in which pad 11 sends an encrypted token to a server 201 which may be a cloud server. The encrypted token sent in step 305 may be the same as the token sent in step 303 or may contain additional information regarding pad 11, such as its location, or other identifying information.

In step 307, server 201 decrypts the token transmitted in step 305 and verifies the identity of receiver 111 and may verify other information, such as accounts, availability of funds, points, or miles, or billing information, etc. When server 201 has determined by applying predetermined logic that the proposed charging procedure is appropriate and that the identity of receiver 111 is established, it sends an encrypted response in step 309 to pad 11. Then pad 11 decrypts the response and commences charging receiver 111.

In addition, once verification has been completed, if necessary, further secure communication via the same (or different) communication channels may be accomplished between receiver 111 and server 201 via pad 11.

In an alternative embodiment, receiver 111 may communicate directly with server 201 in a secure manner using NFC, or Bluetooth, or a variety of other communication modes, such as CDMA, GSM, etc. Receiver 111 may identify itself to a server 201 and provide information about its location utilizing an appropriate mode of GPS. Server 201 may perform any or all of the functions described above, such as verifying other information, such as accounts, availability of funds, points or miles, or billing information. Server 201 may determine the location of pad 11 by utilizing the GPS information provided by receiver 111 or by other means. Then server 201 may direct pad 11 to commence charging and may perform billing or deduction of points or miles, etc.

The direct connection between server and receiver will permit the receiver to get charging service rights or credits without going through the pad if the receiver is at the owner's home or another location far from the pad. Furthermore, if there is a connection failure between the pad and the server, a direct connection between the pad and receiver will facilitate authentication and communication prior to charging.

Thus, a variety of situations are envisioned. For example, if there is no connection between the server and both the charging pad and receiver, it is envisioned that credits, miles, or points that may be stored on the receiver may be utilized. If there is a connection between the server and the pad, but not to the receiver, the actions previously described may be performed. If there is a connection between the server and receiver, but not the pad, credibility may be checked via a 3G link. The charging signal may be provided by the server to the receiver which relays the charging signal to the pad. Finally, if there is a connection between the cloud server and both the pad and receiver, any of the method discussed above may be employed.

Various exemplary embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter;

it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. A method for wirelessly charging a receiver at a charging pad, the method at the charging pad comprising:
   implementing an authentication procedure between the charging pad and a receiver via an NFC communications channel;
   if the authentication procedure is successful between the charging pad and the receiver via the NFC communication channel, receiving a first encrypted token from the receiver;
   decrypting the first encrypted token and storing as the first token;
   sending a second encrypted token to a server, wherein the second encrypted token includes an encrypted version of the first token and information about the charging pad; and further includes the encrypted identification of the registered owner of the receiver;
   receiving an encrypted response from the server in response to sending the second encrypted token;
   decrypting the response from the server to determine that charging of the receiver is appropriate; and
   commencing wireless charging of the receiver if it is determined from the decrypted response that charging of the receiver is appropriate.

2. The method of claim 1, wherein the second encrypted token includes information about the location of the charging pad.

3. The method of claim 1, wherein the second encrypted token includes information about the identity of the charging pad.

4. The method of claim 1, wherein the second encrypted token includes information about payment for the charging.

5. The method of claim 1, wherein once it has been determined from the decrypted response that charging of the receiver is appropriate, supporting further secure communication between the receiver and the server via the charging pad.

6. The method of claim 1, further comprising receiving secure encrypted communication from the receiver at the charging pad via the NFC communications channel, the secure encrypted communication including an identification of the registered owner of the receiver.

7. The method of claim 1, further comprising receiving secure encrypted communication from the receiver at the charging pad via the NFC communications channel, the secure encrypted communication including a standard by which the receiver must be charged.

8. The method of claim 1, further comprising encrypting the standard by the which the receiver must be charged in the second encrypted token.

9. The method of claim 1, further comprising receiving secure encrypted communication from the receiver at the charging pad via the NFC communications channel, the secure encrypted communication including data related to payment for the charging.

10. The method of claim 1, further comprising encrypting the data related to payment for the charging in the second encrypted token.

11. A charging pad for wirelessly charging a receiver, the charging pad comprising:
    a controller;
    a secure element; and
    an NFC communications module;
    wherein the controller, secure element, and NFC communication module are configured to:
    implement an authentication procedure between the charging pad and a receiver via an NFC communications channel;
    if the authentication procedure is successful between the charging pad and the receiver via the NFC communication channel, receive a first encryption token from the receiver;
    decrypt the first encrypted token and store as the first token;
    send a second encrypted token to a server, wherein the second encrypted token includes an encrypted version of the first token and information about the charging pad and further includes the encrypted identification of the registered owner of the receiver;
    receive an encrypted response from the server in response to sending the second encrypted token;
    decrypt the response from the server to determine that charging of the receiver is appropriate; and
    commence wireless charging of the receiver if it is determined from the decrypted response that charging of the receiver is appropriate.

12. The charging pad of claim 11, wherein the second encrypted token includes information about the location of the charging pad.

13. The charging pad of claim 11, wherein the second encrypted token includes information about the identity of the charging pad.

14. The charging pad of claim 11, wherein the second encrypted token includes information about payment for the charging.

* * * * *